United States Patent [19]
Huang et al.

[11] Patent Number: 5,946,429
[45] Date of Patent: Aug. 31, 1999

[54] TIME-DIVISION MULTIPLEXING OF POLARIZATION-INSENSITIVE FIBER OPTIC MICHELSON INTERFEROMETRIC SENSOR

[75] Inventors: Shih-Chu Huang, Kao Hsiung; Wuu-Wen Lin, Kao Hsiung Hsien, both of Taiwan

[73] Assignee: Chung Shan Institute of Science and Technology

[21] Appl. No.: 08/806,671

[22] Filed: Feb. 26, 1997

[30] Foreign Application Priority Data

Nov. 29, 1996 [TW] Taiwan ................................. 85114744

[51] Int. Cl.[6] ........................................................ G01J 9/02
[52] U.S. Cl. ...................... 385/12; 250/227.14; 356/345; 385/15
[58] Field of Search .................................... 385/1, 3, 4, 7, 385/11, 12, 15, 24; 250/227.12, 227.14, 227.17; 356/345, 349–351

[56] References Cited

U.S. PATENT DOCUMENTS

| | | | |
|---|---|---|---|
| 4,770,535 | 9/1988 | Kim et al. ................................ | 356/345 |
| 5,028,801 | 7/1991 | Gerdt .................................. | 250/227.12 |
| 5,140,154 | 8/1992 | Yurek et al. ........................ | 250/227.12 |
| 5,206,924 | 4/1993 | Kersey ....................................... | 385/24 |
| 5,502,782 | 3/1996 | Smith .............................................. | 385/7 |
| 5,696,857 | 12/1997 | Frederick .................................. | 385/12 |
| 5,754,293 | 5/1998 | Farhadiroushan ....................... | 356/345 |

*Primary Examiner*—John D. Lee
*Attorney, Agent, or Firm*—Rosenberg, Klein & Bilker

[57] ABSTRACT

This invention concerns with a time-division multiplexing system of polarization-insensitive Michelson interferometric fiber optic sensors, where the compensating interferometer is equipped with a 3×3 coupler. It uses the two reflections from the Faraday rotator mirrors of sensor interferometer and compensating interferometer, respectively, in a totally passive manner, to overcome the polarization-induced signal fading in the multiplexing sensor system. The compensating interferometer with matching optical paths is used to reduce the phase-induced intensity noise, at the same time it allows the use of laser source with proper coherence length to reduce the crosstalk between sensors and the crosstalk caused by Rayleigh scattering. This system allows the use of low-loss conventional single-mode optic fiber as lead fiber, and offers advantages in building the fiber optic sensor array system with long-distance lead fiber. Furthermore, this system is characteristic of good performance on lead fiber insensitivity. The use of 3×3 demodulation circuits increases the sensor bandwidth significantly without increasing the sampling rate.

16 Claims, 7 Drawing Sheets

TIME-DIVISION MULTIPLEXING OF POLARIZATION-INSENSITIVE FIBER OPTIC MICHELSON INTERFEROMETRIC SENSOR

FIELD OF THE INVENTION

This invention concerns with a time-division multiplexing system of fiber optic interferometric sensors. Specifically, it is a time-division multiplexing system for polarization-insensitive fiber optic Michelson interferometric sensors. It allows the use of low-loss conventional single-mode fiber as lead fiber and is advantageous in long-distance signal transmission. It lowers the lead fiber crosstalk and raises the sensor sensitivity and sensor bandwidth.

DESCRIPTION OF PRIOR ART

Polarization-induced signal fading is a serious problem in a double-arm fiber optic interferometric (like the Mach-Zehnder and Michelson types) sensor. The polarization-induced signal fading is even more complicated and severe in multiplexed sensor arrays based on these two interferometers, because the polarization states of individual optical paths in the system changes independently, leading to constantly changing the fringe visibility of the interfering signal of each sensor. The traditional way to overcome the polarization-induced signal fading is to use the polarization maintaining fibers. The polarization maintaining fiber sensor arrays requires very expensive fibers and relevant components. To configure the sensor arrays is also very difficult. If the specifications of components are not excellent or the polarization maintaining fiber splicing is faulty (such as axial misalignment) or when the number of sensors is large, the performance of the sensor arrays degrade significantly[1]. Therefore, the polarization-maintaining fiber sensor arrays is not really practical.

Recently the Faraday rotator mirror (FRM) is used to replace the reflector at the ends of the two optical fiber arms in the Michelson interferometer. As a result, the regular optical fiber can be used to make polarization-insensitive fiber optic Michelson interferometer[2][3]. This interferometer eliminates the polarization-induced signal fading by compensation of the birefrigence effect in a retraced fiber path. A number of different interferometric sensor multiplexing have been reported, including: (1) Time-division multiplexing (TDM), (2) Frequency-division multiplexing (FDM), (3)Coherent multiplexing[4], etc. TDM has gained broad attention because it has the advantages of high sensitivity and low crosstalk[5]. The present inventors, with many years of practical experience in the fiber optic sensor and communication fields, have made dedicated effort resulting in the successful development of a time-division multiplexing of polarization-insensitive fiber optic Michelson interferometric sensors (TDM-PIFOMI)[6][7][8].

SUMMARY OF THE INVENTION

This TDM-PIFOMI invention implements the polarization-insensitive fiber optic Michelson interferometer on a time-division multiplexing system, solving the polarization-induced signal fading in the TDM sensor arrays. The TDM-PIFOMI system generate the interference signals by optical path matching compensating interferometer (CI), reducing the phase-induced intensity noise significantly[9].

The TDM-PIFOMI system requires suitable demodulation circuit to demodulate signals from various sensors. Commonly seen are passive homodyne demodulation using phase-generated carrier (PGC demodulation)[10] or passive symmetric demodulation using 3×3 fiber coupler (3×3 demodulation)[11]. The 3×3 demodulation does not require a carrier phase signal, and therefore, has better sensor bandwidth (nearly ten times compared with the PGC demodulation) and high frequency dynamic range. This invention is about a TDM-PIFOMI system with a 3×3 demodulator. Furthermore, the various crosstalk signals in this system can be reduced considerably array with adequate configuration and laser source with adequate coherence length[7][8].

In order to help the evaluation committee appreciate the features and technical contents of this invention, figures and detailed explanations are presented below. It should be noted, however, figures are for reference only and are not meant to be restrictive about the patent.

BRIEF DESCRIPTION OF THE DRAWINGS

In order that the present invention may more readily be understood the following description is given, merely by way of example with reference to the accompanying drawings, in which.

DESCRIPTION OF PREFERRED EMBODIMENT

Figure 1:
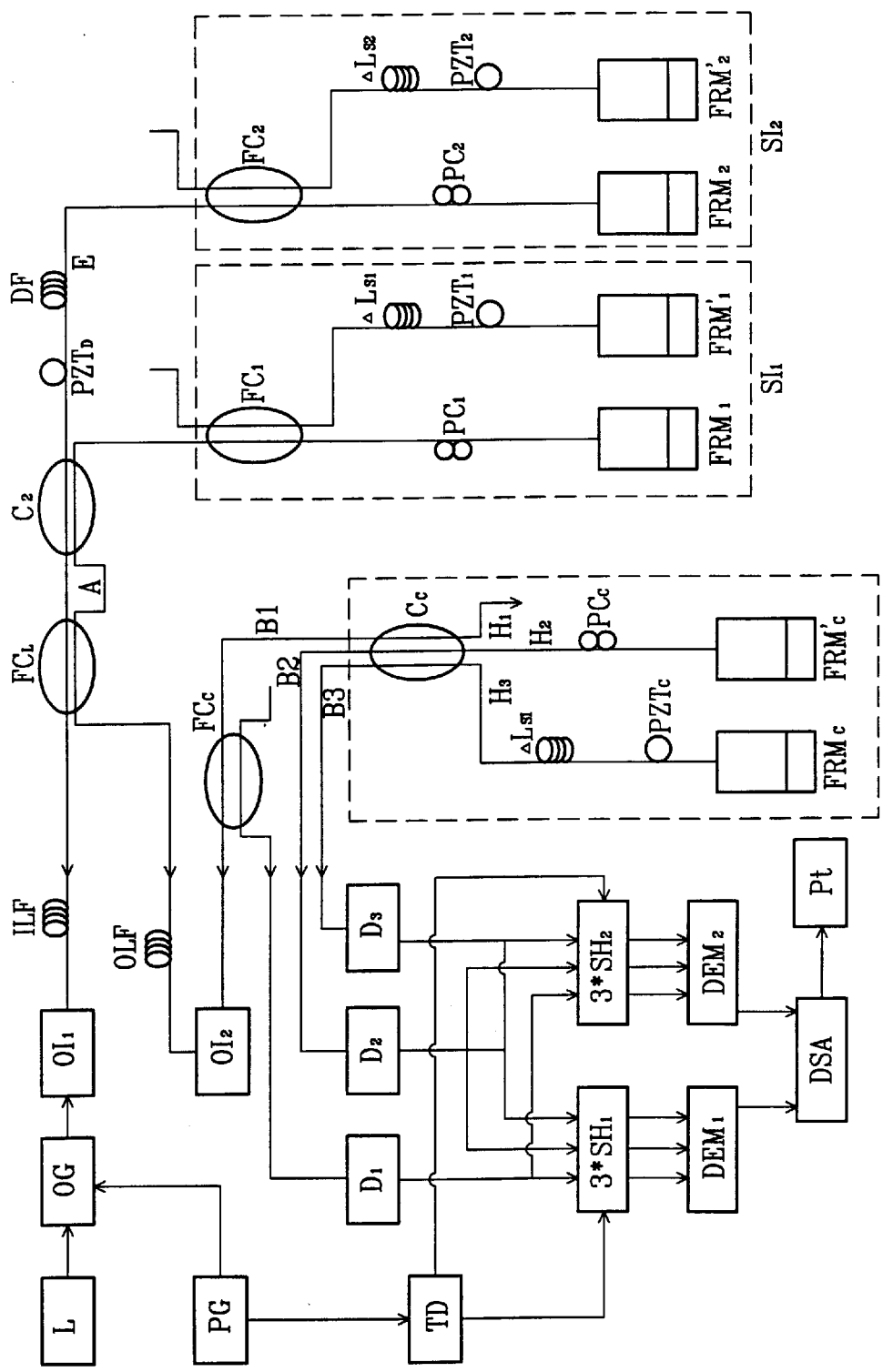
FIG. 1 is two sensors TDM-PIFOMI system with a 3×3 directional coupler.

Please refer to FIG. 1, which shows a TDM-PIFOMI system with two sensors and a 3×3 demodulator. A continuous-wave laser light L, passing the light amplitude modulator which acts as an optical gate (OG) and through the control of pulse generator (PG), becomes a single light pulse for each period and suitable for the TDM system. The unbalanced Michelson interferometer of the first sensor $SI_1$ consists of a 2×2 fiber coupler $FC_1$ and two Faraday rotator mirrors $FRM_1$ and $FRM'_1$. The unbalanced Michelson interferometer of the second sensor $SI_2$ consists of a 2×2 fiber coupler $FC_2$ and two Faraday rotator mirrors FRM2 and $FRM'_2$. The compensating interferometer (CI) consists of a 3×3 fiber coupler $C_c$ and two Faraday rotator mirrors $FRM_C$ and $FRM'_C$. The path difference between the unbalanced optical fiber arms of $SI_1$, $SI_2$ and CI are $\Delta Ls_1$, $\Delta Ls_2$ and $\Delta L_{CI}$, respectively. Ideally the TDM-PIFOMI system requires a matched optical path between CI and all sensors, i. e. $\Delta Ls_1 = \Delta Ls_2 = \Delta L_{CI} = \Delta L$. Between the coupler $FC_L$ and optical isolator (OI) $OI_1$ is the input lead fiber (ILF). Between $FC_L$ and $OI_2$ is the output lead fiber (OLF). Between couplers $C_2$ and $FC_2$ is the delay fiber (DF). On SI$_1$, SI$_2$ and CI there are polarization controllers PC$_1$, PC$_2$ and PC$_C$ to change the polarization states, respectively. Similarly, there are phase modulator PZT$_1$, PZT$_2$ and PZT$_C$ to generate separate phase signals. The three output intensities of the 3×3 coupler C$_C$ are converted into voltage pulse signals through light receivers D$_1$, D$_2$ and D$_3$. Afterward, using time delay generator (TD) control the sample/hold (SH) circuit to obtain the interference signals of the sensor. Since each light receiver needs a corresponding sample/hold circuit, we use 3×XSH$_1$ and 3×SH$_2$ to represent sample/hold circuit set of SI$_1$ and SI$_2$, respectively. The interference signals of the two sensors are sampled at proper trigger times and then are demodulated by the 3×3 demodulators DEM1 and DEM2 to become the sensed signals. The sensed signals are connected to the dynamic signal analyzer (DSA) and plotter (Pt), to analyze their characteristics.

If a lossless and polarization-insensitive ideal 2×2 fiber coupler has a light-splitting ratio of 50/50, the fields E$_{o,1}$ and E$_{o,2}$ of the two output fibers can be expressed as follows[12]:

$$\begin{pmatrix} E_{o,1} \\ E_{o,2} \end{pmatrix} = \begin{bmatrix} 1/\sqrt{2} & \exp(i\pi/2)/\sqrt{2} \\ \exp(i\pi/2)/\sqrt{2} & 1/\sqrt{2} \end{bmatrix} \begin{pmatrix} E_{i,1} \\ E_{i,2} \end{pmatrix}, \quad (1)$$

where E$_{i,1}$ and E$_{i,2}$ are the electic filed of the two input fibers. From equation (1) one can see that the phase of electric field in an uncoupled output fiber leads that of a coupled output fiber by ($\pi/2$) rad. In this article, the wave is represented by exp [i(kz-$\omega$t)], positive phase represents the positive path delay. For a lossless and polarization-insensitive ideal 3×3 fiber coupler, the electric fields E$_{o,1}$, E$_{o,2}$ and E$_{o,3}$ of the three output fibers can be expressed as follows[13]:

$$\begin{pmatrix} E_{o,1} \\ E_{o,2} \\ E_{o,3} \end{pmatrix} = \begin{bmatrix} u & v & v \\ v & u & v \\ v & v & u \end{bmatrix} \begin{pmatrix} E_{i,1} \\ E_{i,2} \\ E_{i,3} \end{pmatrix}, \quad (2)$$

where E$_{i,1}$, E$_{i,2}$ and E$_{i,3}$ are electric fields of the three input fibers, u=[exp (i2K$_C$L)+2 exp (-iK$_C$L)]/3, and v=[exp (i2K$_C$L)-exp (-i K$_C$L)]/3,(K$_C$ and L are the coupling coefficient and the coupling length of the 3×3 fiber coupler, respectively). If the ideal 3×3 fiber coupler has light-splitting ratio of 1:1:1, one obtains cos(3K$_C$L)=-½.

At point A in FIG. 1 (between FC$_L$ and C$_2$), the Jones vector of an elliptically polarized input light beam at time t$_0$ can be expressed as $$J_0 = \begin{bmatrix} A_x\exp(i\delta_x) \\ A_y\exp(i\delta_y) \end{bmatrix}. \quad (3)$$

The light travels along a section of fiber and reaches the terminal FRM, reflected along the same optical path to the original point, the transmission matrix can be expressed as[3]

$$R = \sqrt{a}\begin{pmatrix} 0 & -1 \\ -1 & 0 \end{pmatrix}, \quad (4)$$

where $\alpha$ is the light power decay factor. In this article, we use the first sensor SI$_1$ as an example to derive equations. Similar results can be obtained for other sensors. The light beam from point A in FIG. 1, after entering SI$_1$ and reflected from FRM$_1$ and FRM'$_1$, returns to A at time (t$_0$+t$_1$) and (t$_0$+t$_1$), respectively. The electric fields of the reflected light beams, E$_1$ and E'$_1$, are as follows:

$$E_1 = \begin{pmatrix} E_{x1} \\ E_{y1} \end{pmatrix} = \sqrt{\alpha_1}\begin{pmatrix} 0 & -1 \\ -1 & 0 \end{pmatrix} J_0\exp(i\omega t_1) \quad (5a)$$

$$= -\sqrt{\alpha_1}\begin{bmatrix} A_y\exp(i\delta_y) \\ A_x\exp(i\delta_x) \end{bmatrix}\exp(i\omega t_1),$$

$$E'_1 = \begin{pmatrix} E'_{x1} \\ E'_{y1} \end{pmatrix} = \sqrt{\alpha'_1}\begin{pmatrix} 0 & -1 \\ -1 & 0 \end{pmatrix} J_0\exp[i(\omega t'_1 + 2\phi_1 + \pi)] \quad (5b)$$

$$= -\sqrt{\alpha'_1}\begin{bmatrix} A_y\exp(i\delta_y) \\ A_x\exp(i\delta_x) \end{bmatrix}\exp[i(\omega t'_1 + 2\phi_1 + \pi)],$$

where t$_1$ and t'$_1$ are light propagation times of going through the two fiber-arm paths in SI$_1$, with the relation t'$_1$-t$_1$=2$\Delta$L n/c. n is the refraction index of the fiber core, c is the speed of light, $\alpha_1$ and $\alpha'_1$ are light power decay factors, $\phi_1$ is the phase signal generated by PZT$_1$.

E$_1$ and E'$_1$, after going through OLF and FC$_C$, propagate from point A to point B$_1$ (near the 3×3 coupler) on the first coupling fiber of the 3×3 coupler. The net birefringence in the segment of the fiber can be represented as a generalized elliptical retarder described by the the unitary matrix[3]:

$$R_0 = \frac{\sqrt{\alpha_0}}{q_0}\begin{pmatrix} g_0 & -h_0^* \\ h_0 & g_0^* \end{pmatrix}, \quad (6)$$

where * means the conjugate, $\alpha_0$ is the light power decay factor, q$_0^2$=(g$_0$g$_0$*+h$_0$h$_0$*), parameters g$_0$ and h$_0$ depend on the birefringence properties of the fiber. The two light beams E$_1$ and E'$_1$ with a time difference of 2$\Delta$Ln/c, passing through 3×3 coupler in CI, become separately coupled to the two optical arms with FRM$_C$ and FRM'$_C$, resulting in interference signals. Other coupling paths cannot generate interference signals. Electric fields E$_1$ and E'$_1$, after reflection through FRM$_C$ and FRM'$_C$, are split by the 3×3 coupler again to coupled into three coupling fibers independently. We obtain three interference signals of SI$_1$ at points B$_1$, B$_2$ and B$_3$, respectively (details are given in the appendix). The two electric fields generating interference signal at B$_1$, i.e. E$_{0,1}$ and E'$_{0,1}$, can be represented by[8]

$$E_{o,1} = v^2\sqrt{\alpha_c\alpha_1}\exp[i(\omega t + 2\phi_c)]\left[\begin{pmatrix} 0 & -1 \\ -1 & 0 \end{pmatrix} R_0\begin{pmatrix} 0 & -1 \\ -1 & 0 \end{pmatrix} J_0\right], \quad (7a)$$

$$E'_{o,1} = v^2\sqrt{\alpha'_c\alpha'_1}\exp[i(\omega t + 2\phi_1 + \pi)]\left[\begin{pmatrix} 0 & -1 \\ -1 & 0 \end{pmatrix} R_0\begin{pmatrix} 0 & -1 \\ -1 & 0 \end{pmatrix} J_0\right], \quad (7b)$$

where $\alpha_C$ and $\alpha'_C$ are, respectively. light power decay factors relating to the reflection paths through FRM$_C$ and FRM'$_C$, $\phi_C$ is the phase signal generated by PZT$_C$. t$_C$ and t'$_C$ are the light propagation times of the two fiber-arm paths in CI, with the relation t$_C$-t'$_C$=2$\Delta$Ln/c. Because the path difference $\Delta$L for both SI$_1$ and CI is equal, we obtain t$_C$+t'$_1$= t'$_C$+t$_1$=t, meaning E$_{o,1}$ and E'$_{o,1}$ arrive at B$_1$ almost at the same time but with a phase difference $\Delta\phi$=2 $\phi_1$-2$\phi_C$+$\pi$. These two overlapping light pulse beams generate an interference signal of SI$_1$. Furthermore, electric fields of SI$_1$ at points B$_2$ and B$_3$ are (E$_{o,2}$, E'$_{o,2}$) and (E$_{o,3}$, E'$_{o,3}$). One can obtain E$_{o,2}$=E$_{o,1}$, E$_{o,3}$=(u/v) E$_{o,1}$, E'$_{o,2}$=(u/v) E'$_{o,1}$ and E'$_{o,3}$=E'$_{o,1}$. Therefore, the six electric fields of SI$_1$ have the same polarization state. From equation (7a) or (7b) one can obtain this polarization state:

$$J_T = \begin{pmatrix} 0 & -1 \\ -1 & 0 \end{pmatrix} R_0 \begin{pmatrix} 0 & -1 \\ -1 & 0 \end{pmatrix} J_0, \qquad (8)$$

Since the six electric fields have the same polarization states, the three output interference signals of $SI_1$ do not suffer polarization-induced signal fading problem.

Figure 2:
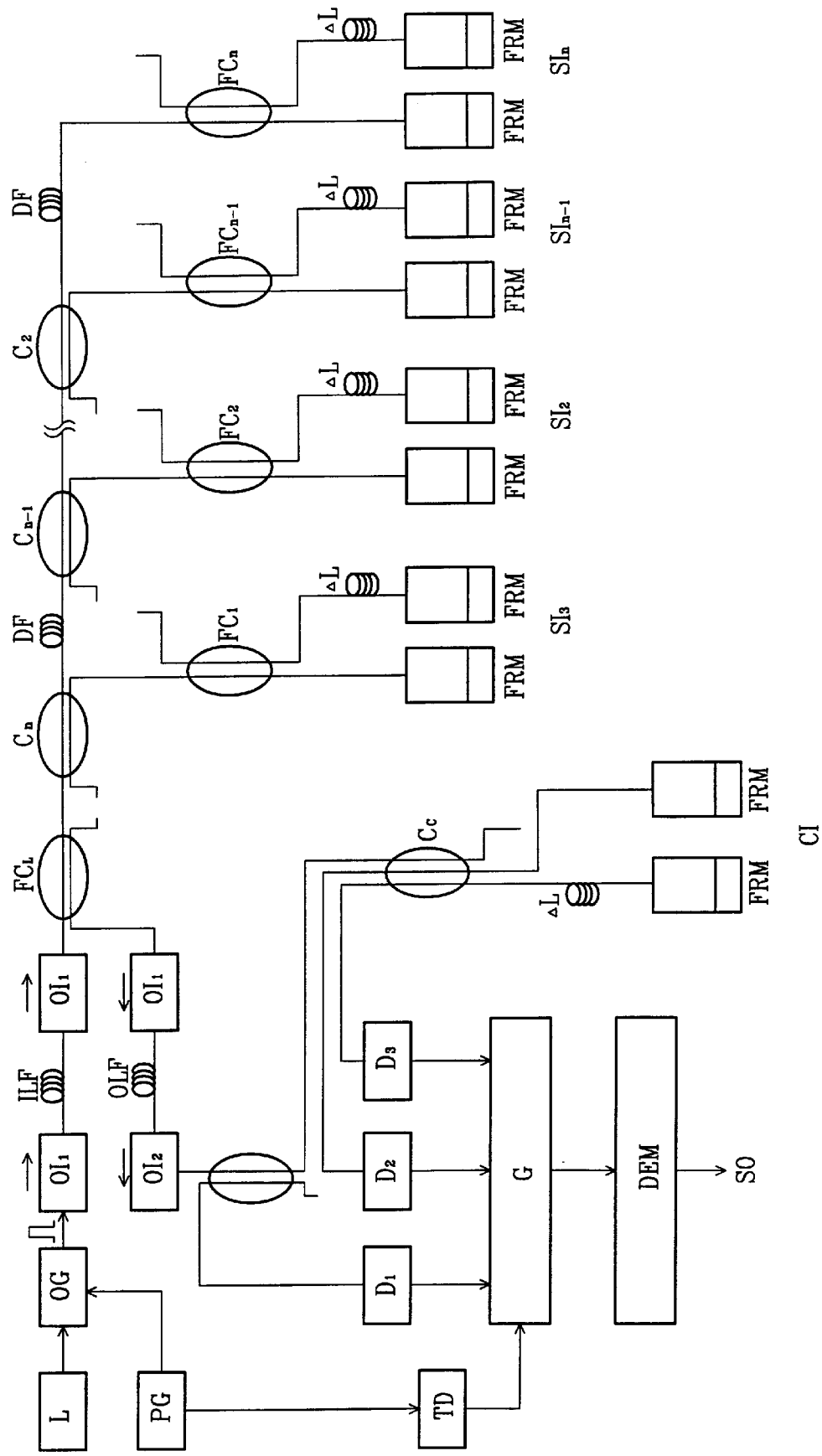
FIG. 2 is N sensors TDM-PIFOMI system with a 3×3 directional coupler

A TDM-PIFOMI system with N sensors and the CI with a 3×3 directional coupler is shown in FIG. 2. For the three output light pulse trains from the 3×3 coupler $C_C$, each period contains (2N+1) light pulses, of which N pulses correspond to the N sensor signals, respectively. The three light pulse trains, after going through respective light receivers $D_1$, $D_2$ and $D_3$, are converted to voltage pulse signals. The interference signals of N sensors are obtained by N sample/hold circuit sets with the proper trigger signals from the time delay generator (TD), respectively. In FIG. 2 we simply use G to represent all the sample/hold circuit sets. At different times the three interference signals of each sensor are extracted. After the 3×3 demodulator DEM at respective sensors, the sensed signals (SO) are obtained.

Refer to FIG. 2. The power splitting ratio of the series couplers, $C_2$ through $C_n$, are properly chosen so that the N sensors, $SI_1$ through $SI_n$, have the same average output light intensity. The series coupler before the Kth sensor is $C_{N-K+1}$. Assuming its light-splitting ratio is $(X_{N-K+1}-1):1$ (i.e., the power ratio $1/X_{N-K+1}$ coupling into the Kth sensor), and using the substitution method, one obtains the general expression for $X_m (2<m<N)^{(8)}$ $$X_m = \frac{1 - a^{(m-1)}}{a^{(m-2)}(1-a)} + \frac{1}{a^{(m-2)}}, \qquad (9)$$

where $a^2$ is the incremental propagation loss between two successive sensors. If the fiber splice loss is 0.05 dB and the coupler excess loss is 0.1 dB, then $\alpha$ is 0.955.

For a fiber optic interferometric sensors multiplexing system, the main noise is the phase-induced intensity noise caused by the optical path difference between the two interference light beams. Since the TDM-PIFOMI system with matched optical path between the compensating interferometer and all sensors can significantly reduce the phase-induced intensity noise[9]. This is one of the most important features of this system. The sensitivity of an interferometric fiber sensor is proportional to the length of the sensing fiber. In the present system the only limitation on length is that the sensing fiber and the reference fiber of each sensor have a length difference $\Delta L$. The length of sensing fiber is not limited. It can be increased to raise the sensitivity. This is another advantage of this system. The sources of optical crosstalk in the TDM-PIFOMI system include lead fiber crosstalk, crosstalk between sensors and delay fiber crosstalk. They are discussed below.

(1) Lead Fiber Crosstalk

In this system, there is only one light pulse through input lead fiber (ILF) in each sampling period. Therefore, there is no lead fiber crosstalk from the induced phase signal of the ILF, hence the notion of insensitive lead fiber. The light beam through the output lead fiber (OLF) is not a single light pulse in each sampling period. Therefore, the induced phase signals will create crosstalk among output signals from various sensors[7][14], and OLF is known as the sensitive lead fiber. For each sensor, there are two light pulses reflected from the two FRM, with a time difference $\Delta t_L$ ($\Delta t_L = 2n\Delta L/C$, where $\Delta L$ is the path difference in the interferometer, n is the refraction index of the fiber core, C is the speed of light). The two light pulses are coupled through OLF and propagated to CI. If $\phi_L(t)=\alpha_L \cos(\omega_L t)$ is the OLF induced phase signal of the first light pulse, then $\phi_L(t+\Delta t_L)=\alpha_L \cos[\omega_L(t+\Delta t_L)]$ is the OLF induced phase signal of the second light pulse. If $\Delta\phi_L$ is the effective phase signal of the sensor output signal (caused by $\phi_L$), the lead fiber crosstalk parameter $A_{Lead}$ is $$A_{Lead} = 20\log\left(\frac{\text{amplitude of } \Delta\phi_L}{\text{amplitude of } \Delta\phi_L}\right) \qquad (10)$$

$$= 20\log\left(\frac{4\pi n}{c} f_L \Delta L\right)$$

If $\Delta L=10$ m, $f_L=100$ Hz, then $A_{Lead}$ is −84 dB. The lowering of lead fiber crosstalk is very important when sensor arrays are used in the practical environment. Experimentally, there has been effort to use active compensation method to lower the lead fiber crosstalk in a frequency-division multiplexing system. For the same induced phase signal frequency 100 Hz, the $A_{Lead}$ obtained is −32 dB[15]. Clearly, the TDM-PIFOMI system is characteristic of good performance on lead fiber insensitivity.

(2) Crosstalk Between Sensors

In a TDM system, ideally the light intensity between light pulses should be zero. In reality, after a continuous wave laser light passing through amplitude modulator, the light intensity between light pulses is not zero (the non-zero light intensity denoted as low level light pulse), and will cause crosstalk between sensors. The selection of light amplitude modulator with good extinction ratio will reduce sensor crosstalk. In the present system, the low level light pulses that cause the crosstalk among sensors are generated by the laser source at different times. If the laser source has a coherence length $L_C$ satisfying the condition $d_K<<L_C<<2\Delta L$ (where $d_K=|\Delta L_{CI}-\Delta L_K|$, $\Delta L_K$ is the path difference between the two unbalanced optical fiber arms of the Kth sensor), then the path difference between light pulse and next low level light pulse is bigger than $L_C$ and the sensor crosstalk cannot create. In such case, the sensor crosstalk is reduced significantly[7][8].

(3) Delay Fiber Crosstalk

Among all delayed fibers (DF) that connect the sensors, the Rayleigh backward scattering waves will produce delay fiber crosstalks. Every point on the backward light pulse generated by the Rayleigh backward scattering is integrated from the entire input light pulse. The effective integration distance is $(\frac{1}{2})L_P$ ($L_P$ is the length of the light pulse). In the present system, if the coherence length $L_C$ of the laser source satisfies $d_K<<L_C<<L_P$, then the integration distance of the backward light pulse is greater than $L_C$ and will not create delay fiber crosstalk among delay fibers. The delay fiber crosstalk is then significantly lower under the condition[7][8].

In summary, the important requirements of the TDM-PIFOMI system in FIG. 2 are as follows[8]:

(1) Use long-wavelength (1.55 μm) laser diode with weak Rayleigh scattering in fiber, and with coherence length $L_C$ satisfying the condition $d_K<<L_C<<L_P$ to lower sensor crosstalks and delay fiber crosstalks. If the number of sensors in a TDM-PIFOMI system increases, from eq. (9) we can see that light intensity returning to the optical receivers decreases. When the light intensity is too low, the smallest detectable phase signal will increase because of quantum noise. Another advantage of the 1.55 μm laser diode is that laser intensity can be amplified using erbium doped fiber amplifier (EDFA) to meet the system requirement.

(2) Use light amplitude modulator with high extinction ratio (>30 dB) to reduce the crosstalk among sensors.

(3) Use polarization insensitive optical isolator $OI_1$ to avoid laser light feedback to the source. Using $OI_2$ to avoid laser light reaching the output lead fiber and fiber sensor arrays. Use $OI_3$ and $OI4$ so that Rayleigh backward scattering waves of input and output lead fibers cannot return to the sensor arrays.

(4) Use millimeter resolution optical time domain reflectometry as monitor to control the $d_K$ within a few millimeters, so that the phase-induced intensity noise of the Kth sensor will be minimized.

(5) The free ends of all fibers in couplers are with cutout angle>10 degrees, to avoid terminal reflection.

(6) The compensating interferometer should use nearly ideal 3×3 couplers (i. e., nearly equal coupling coefficient between each fiber pairs, low excess loss, light-splitting ratio 1:1:1 at the operated wavelength). This will attain to better linear demodulation of sensor output signals.

The TDM-PIFOMI system shown in FIG. 2 still suffers from two problems:

(1) The use of coupler $FC_C$ and a 3×3 coupler at CI attenuates the light intensities at the three optical receivers significantly.

(2) The light intensity at $D_1$, due to the extra light-splitting passage through $FC_C$, is only one half of the intensity at $D_2$ or $D_3$.

Figure 3:
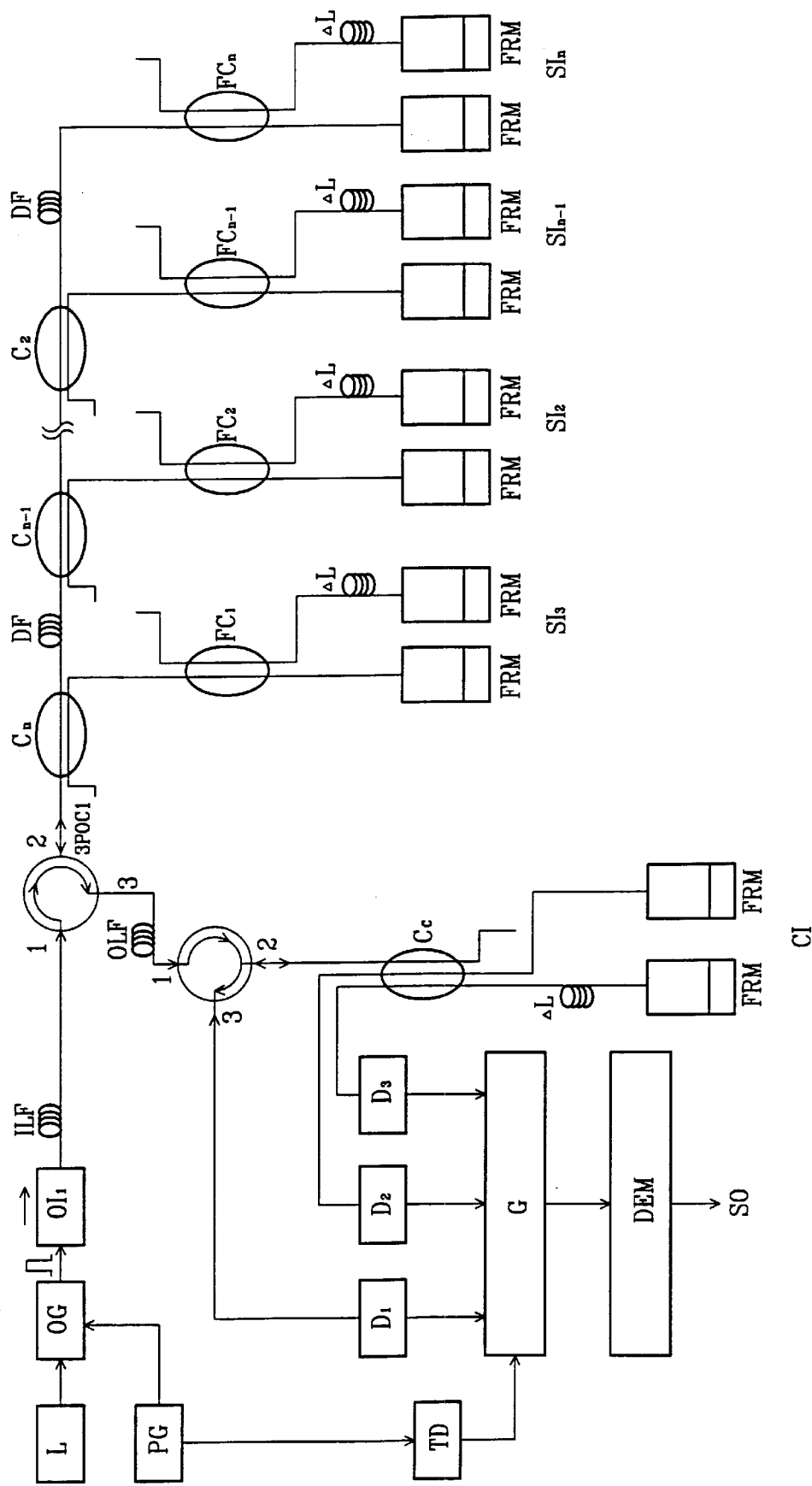
FIG. 3 is an improvement over the TDM-PIFOMI system in FIG. 2, using two 3-port optic circulators (3POC) to replace certain parts.

The use of two 3-port optical circulator (3POC)[16] to replace some of the parts in FIG. 2 can alleviate the two problems above[8]. FIG. 3 shows an improvement by using two 3POC's. The first one, $3POC_1$, can replace $FC_L$, $OI_3$ and $OI_4$. It prevents light pulse trains from sensor arrays returning to the input lead fiber ILF, and also prevent the Rayleigh scattering light of output lead fiber OLF returning to the sensors. The other one, $3POC_2$, replaces $FC_C$ and $OI_2$. It prevents output light pulse trains of CI returning to the output lead fiber OLF. Assume 3POC and OI have 1 dB insertion loss each. Comparing FIG. 3 and 2, the light intensities at receivers $D_1$, $D_2$ and $D_3$ are increased by 11 dB, 9 dB and 9 dB, respectively. The difference of intensity at $D_1$ and $D_2$ or $D_3$ decreases from 3 dB to 1 dB. Furthermore, the enhanced intensities in the system shown in FIG. 3 will improve the phase sensitivity of sensors considerably.

Figure 4:
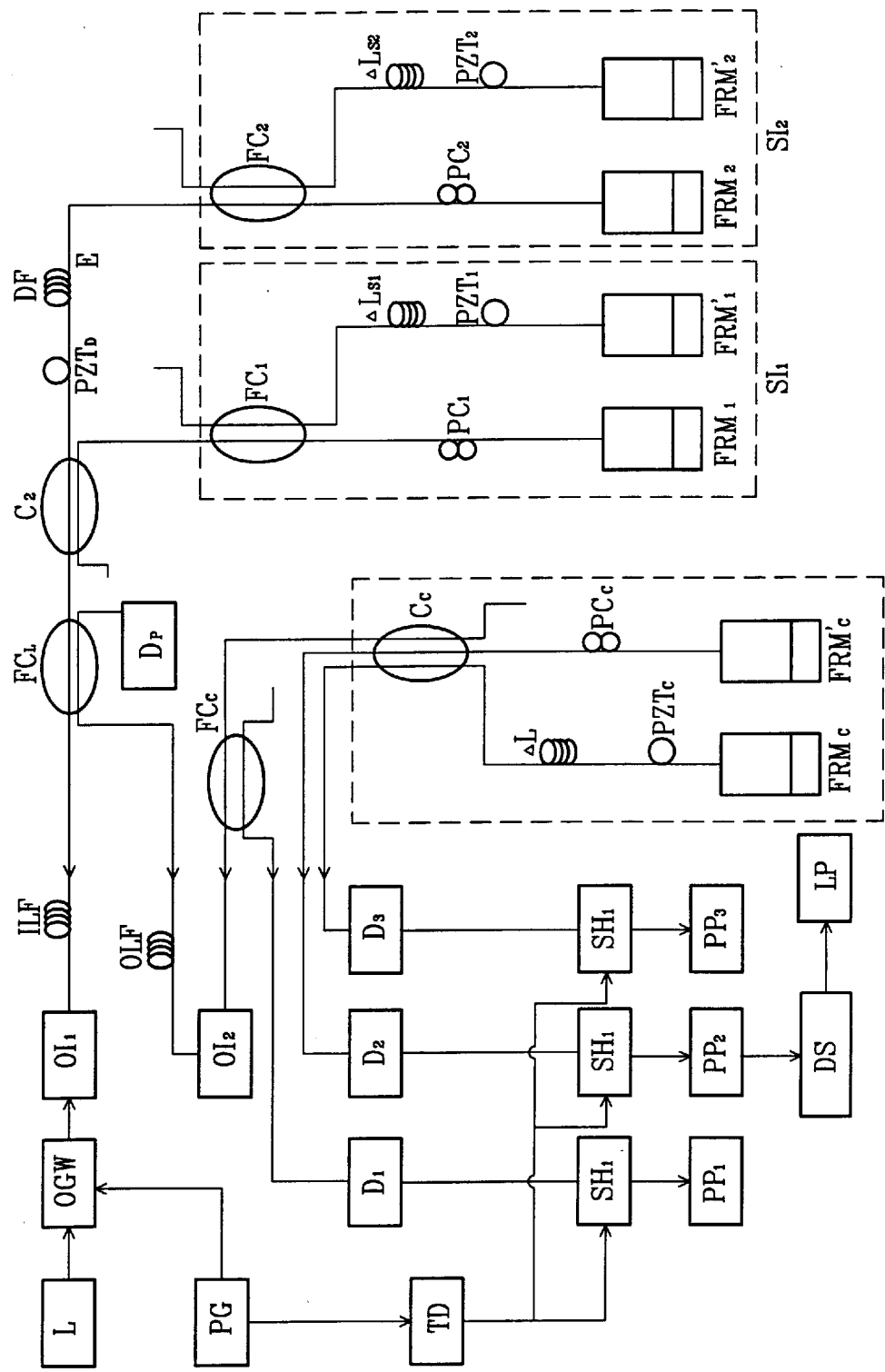
FIG. 4 is a TDM-PIFOMI system where the CI is equipped with a 3×3 coupler. An experimental setup to measure polarization-induced signal fading FIG. 5 refers to FIG. 4. The output light pulse waveform from the pulse detector ($D_p$) and the output light pulse train waveform from the second output detector $D_2$ FIG. 6 refers to FIG. 4. The signal amplitude of the first sensor, when the two Faraday rotator mirrors $FRM_1$ and $FRM'_1$ in $SI_1$ are replaced by reflecting mirrors FIG. 7 refers to FIG. 4. The signal amplitude of the first sensor, when $FRM_1$ and $FRM'_1$ are at the ends of the two fiber optic arms of $SI_1$
Figure 5:
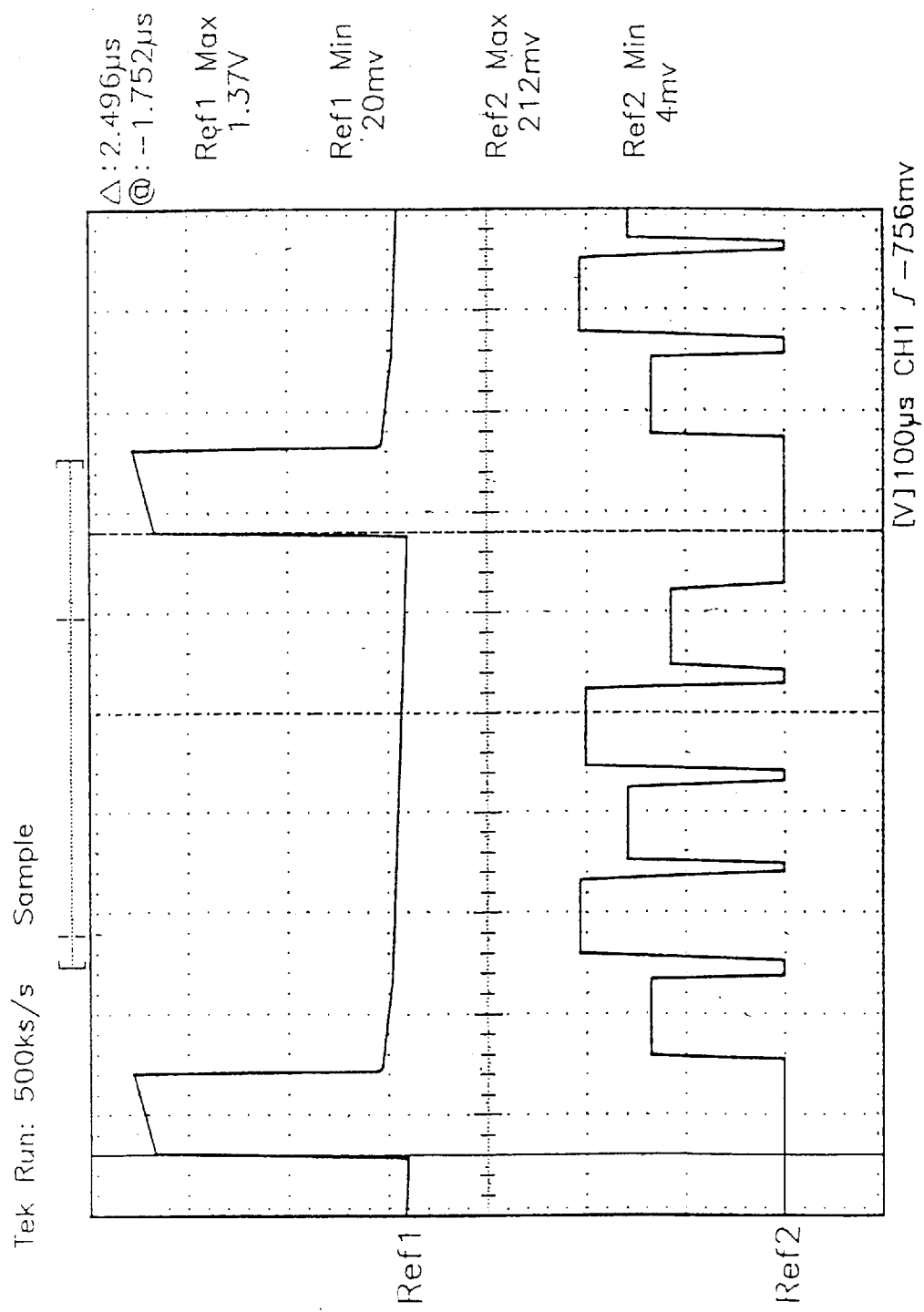

FIG. 4 shows a TDM-PIFOMI system with a 3×3 demodulation circuit. It is an experimental apparatus used to measure the polarization-induced signal fading. The Nd:YAG laser L of wavelength 1319 nm was gated to the 300 ns pulse width and 400 KHz repetition rate by a light amplitude modulator (made with optical guide wave components, hence the abbreviation OGW) and a pulse generator PG. The output from the pulse detector $D_P$ is shown as Ref1 curve in FIG. 5. The output signal from the second output detector ($D_2$) is shown as Ref2 curve in FIG. 5. The pulse trains of Ref2 curve in one period include five pulses, the second and fourth pulses contain the interference signals of $SI_1$ and $SI_2$, respectively. The second interference signal of $SI_1$ is obtained by the second sample/hold circuit of $3 \times SH_1$ circuits of $SI_1$, and the amplitude can be properly recorded by the peak-peak detector $PP_2$[8]. To measure the polarization-induced signal fading, one has to add to $PZT_1$ a low frequency (100 Hz) triangular phase signal with amplitude greater than $2\pi$rad, to facilitate the detection of the amplitude of the interference signals by the peak-peak detector $PP_{s2}$, which is followed by oscilloscope OS and line printer LP to analyze the signal characteristics.

Figure 6:
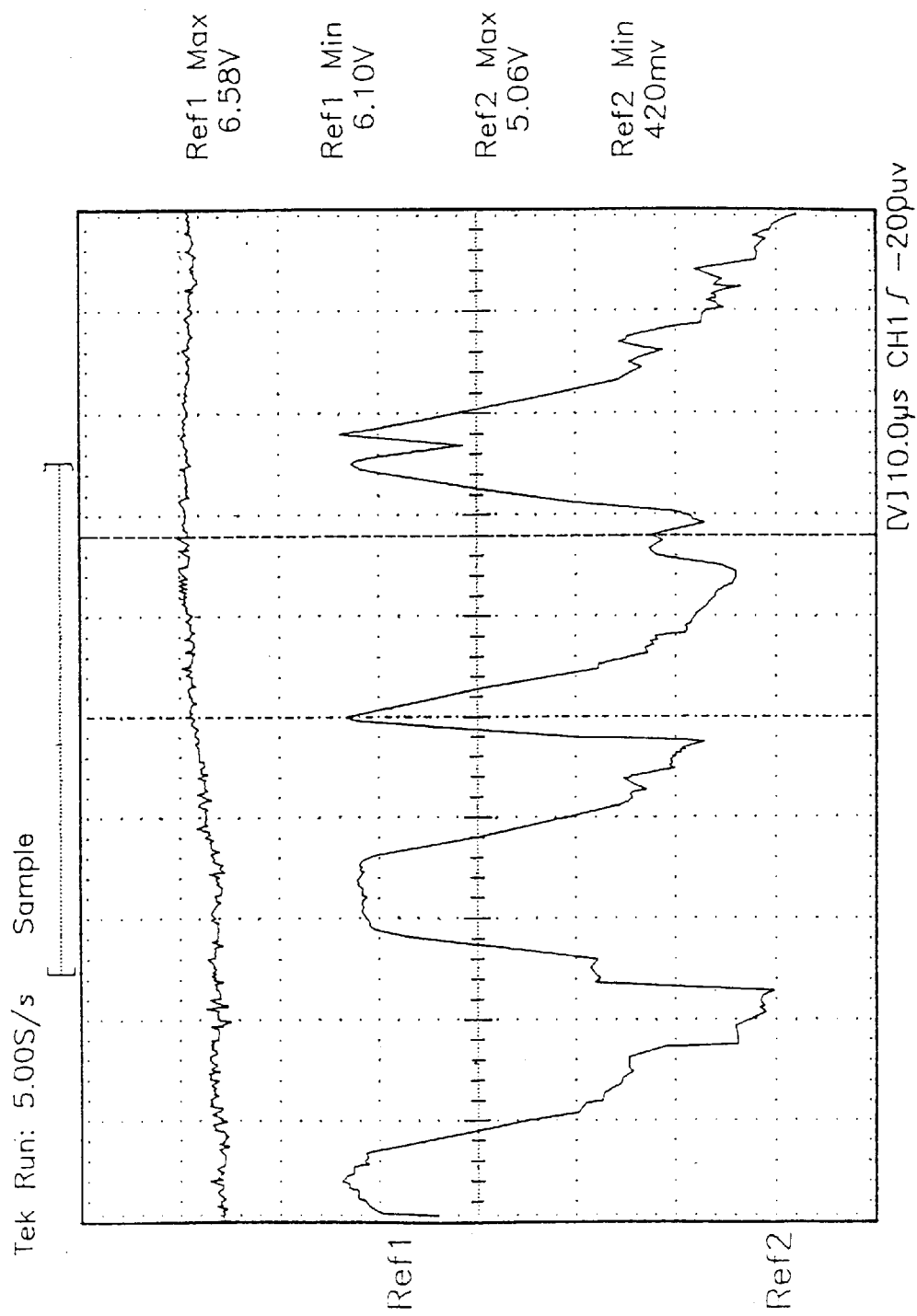
Figure 7:
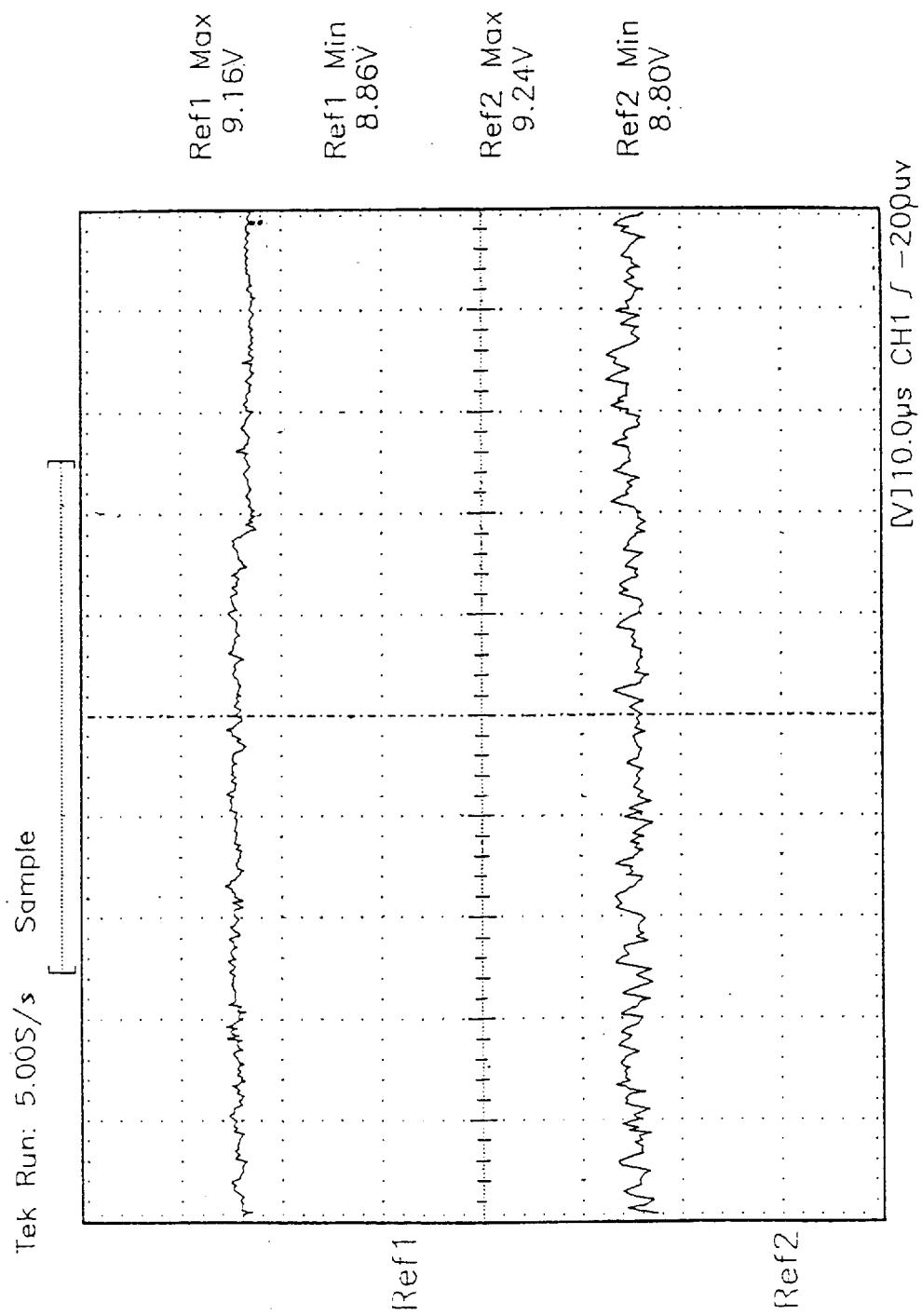

If the two Faraday rotator mirror $FRM_1$ and $FRM'_1$ of $SI_1$ in FIG. 4 are replaced by ordinary reflection mirrors, the amplitude of the envelope of the second output intensity of $SI_1$ is shown in FIG. 6. The Ref1 curve of FIG. 6 is the amplitude when the polarization controller $PC_1$ of $SI_1$ is fixed. The normalized amplitude varies in the 0.93 to 1 range. Ref2 is the case where $PC_1$ is adjusted continuously, the normalized amplitude varies in the 0.08 to 1 range, indicating severe polarization-induced signal fading. When $SI_1$ in FIG. 4 is equipped with $FRM_1$ and $FRM'_1$ at the ends of optical fiber arms, the measured amplitude of same signal is shown in FIG. 7. The Ref1 curve results from fixed $PC_1$ setting and the normalized amplitude varies in the 0.97 to 1 range. Ref2 results when $PC_1$ is adjusted continuously, the normalized amplitude varies in the 0.95 to 1 range, indicating almost no polarization-induced signal fading. From these experiments, it is proven that the TDM-PIFOMI system using a CI with a 3×3 coupler has overcome the polarization-induced signal fading. Therefore, the system is fit for use in real environments (large temperature and pressure variation).

From the description above, the present invention, i.e., a time-division multiplexing of polarization-insensitive fiber optic Michelson interferometric sensors with a compensating interferometer equipped with a 3×3 coupler, by using the reflections of the FRMs of the sensors and the CI for the first time, effectively solves the polarization-induced signal fading of a time-division multiplexing system in a completely passive manner. This system, by using compensating interferometer with matching optical paths, reduces the phase-induced intensity noise significantly. This system also is characteristic of good performance on lead fiber insensitivity. Furthermore, it allows the use of laser source with adequate coherence length to reduce the crosstalks between sensors and crosstalks from Rayleigh scattering. Since this system only restricts the length difference between the sensing fiber and reference fiber of each sensor, but not the individual lengths, the sensing fiber may be lengthened to raise the sensor sensitivity. This system uses the conventional single mode fiber. Comparing with the polarization maintaining fiber, this system is less expensive, more stable and easier to manufacture. It is fit to use in a variety of environments. Since it allows the use of low-loss transmission single mode fiber as lead fiber, it also facilitates the building of optical fiber sensor arrays for long distance signal transmission. All of the above considerations are important advantages. The 3×3 demodulator in this system can increase significantly the sensor bandwidth, offering another important advantage.

In summary, this invention satisfies the innovation and advance requirements of inventions under the patent laws. We hereby petition for the granting of patent to this invention under the applicable laws. We would greatly appreciate your approval, which will be very encouraging to prospective inventors.

The concrete examples earlier are used to explain in detail the purposes, features and effects of this invention. It is possible to modify certain parts of the examples based on the description and still falls within the scope of this invention. For this reason, the scope of this invention is specifically described in the appended claims.

References

[1] M. Tur, Y. S. Boger and H. J. Shaw, "Polarization-induced fading in fiberoptic sensor arrays," *J. Lightwave Technol.*, Vol. 13, pp. 1269–1276, 1995.

[2] N. C. Pistoni and Martinei, "Birefringence effects suppression in optical fiber sensor circuits," in *Proceedings of the 7$^{th}$ optical fiber sensors conference*, Sydney, Australia, 1990 (published by IREE Australia), pp. 125–128, 1990.

[3] A. D. Kersey, M. J. Marrone, an M. A. Davis, "Polarisation-insensitive fibre optic Michelson interferometer," *Electron. Lett.*, Vol. 27, pp. 518–520, 1991.

[4] A. D. Kersey, "Multiplexed fiber optic sensors," *Distributed and Multiplexed Fibre Optic Sensors II*, John P. Dakin Alan D Kersey, Editiors, Proc. SPIE 1797, pp. 161–185, 1993.

[5] J. L. Brooks, B. Boslehi, B. Y. Kim, and H. J. Shaw, "Time-domain addressing of remote fiber-optic interferometric sensor arrays" *J. Lightwave Technol.*, Vol. LT-5, pp 1014–1023, 1987.

[6] S. C. Huang, W. W. Lin and M. H. Chen, "Time-division multiplexing of polarization-insensitive fiber optic Michelson interferometric sensors," Optics Lett., Vol.20, pp. 1244–1246, 1995.

[7] S. C. Huang, W. W. Lin, M. H. Chen S. C. Huang, and H. L. Chao, "Crosstalk analysis and system design of time-division multiplexing of polarization-insensitive fiber optic Michelson interferometric sensors," *J. Lightwave Technol.*, Vol.14, pp. 1488–1500, 1996.

[8] S. C. Huang. W. W. Lin and M. H. Chen "Crosstalk anaiysis of time-division multiplexing of polarization-insensitive fiber optic Michelson interferometric sensors with a 3×3 directional coupler," be accepted by Applied Optics, 1996.

[9] A. Dandridge, and A. B. Tveten, "Phase noise of Single mode diode laser in interferometer system" *Appl. Phys. Lett.* Vol. 39, pp. 530–532, 1981.

[10] A. Dandridge A. B. Tveten, and T. G. Giallorenzi, "Homodyne demodulation scheme for fiber optic sensors using phase generated carrier," *IEEE J. Quantum Electron.*, Vol. QE-18, pp. 1647–1653, 1982.

[11] C. B. Cameron, R. M. Keolian, and S. L. Garrett, "A symmetric analogue demodulator for optical fiber interferometric sensor," "#$34^{th}$ Midwes Symposium on Circuits and Systems, Monterey, Calif., May, 1991.

[12] R. C. Youngquist, L. F. Stokes, and H. J. Shaw, "Effects of normal mode loss in dielectric waveguide iretional couplers and interferometers" *IEEE J. Quantum Electron.*, Vol. QE-19, pp. 1888–1896, 1983.

[13] Liping Sun and Peida Ye, "General aalysis of [3×3] optical-fiber directional couplers" Microwave and Optical Technology Letters, 2, 52–54 (1989).

[14] S. C. Huang, W. W. Lin, and M. H. Chen, "Lead crosstalk in time-division multiplexing of fiber optic interferometric sensors," Semiconductor, Optic Fiber and Integrated Optics Conference, Taipei, Dec. 1995.

[15] J. L. Santos F. Faralu, T. Newson, A P. Leite and D. A. Jackson, "Frequency multiplexing of remote all-fiber Michelson interferometers with lead insensitivity," J. Lightwave Technol., Vol. 10, pp. 853–863, 1991.

[16] Y. Fuji, "High-isolation polarization-independent optical circulator coupled with single-mode fibers," *J. Lightwave Technol.*, Vol. 9, pp. 456–460, 1991.

We claim:

1. A time division multiplexing fiber optic Michelson interferometric sensor system comprising:

(a) a laser light source for generating a continuous wave optical signal;

(b) a modulator optically coupled to said laser light source for generating a pulsed input optical signal responsive to said continuous wave optical signal;

(c) a first optical circulator optically coupled to said modulator;

(d) a plurality of sensors optically coupled to said first optical circulator for collectively generating a pulsed output optical signal responsive to said pulsed input optical signal, each said sensor including an unbalanced Michelson interferometer having a 2×2 optical coupler and a pair of Faraday rotator mirrors coupled thereto;

(e) a second optical circulator optically coupled to said first optical circulator;

(f) a compensating interferometer optically coupled to said second optical circulator for generating responsive to said pulsed output optical signal a plurality of optical interference signals, said compensating interferometer having a 3×3 optical coupler and a pair of Faraday rotator mirrors coupled thereto;

(g) a plurality of optical detectors coupled to said compensating interferometer for respectively transducing said optical interference signals to a plurality of electrical interference signals; and, (h) means coupled to said optical detectors for sampling and demodulating said electrical interference signals at preselected times;

whereby said sensor system is adapted for operation substantially insensitive to polarization-induced signal fading.

2. The time division multiplexing fiber optic Michelson interferometric sensor system as recited in claim 1 wherein each said optical circulator is a three-port optical circulator.

3. The time division multiplexing fiber optic Michelson interferometric sensor system as recited in claim 2 wherein said 2×2 optical coupler of said Michelson interferometer of each said sensor is characterized by substantially a 50/50 light splitting ratio.

4. The time division multiplexing fiber optic Michelson interferometric sensor system as recited in claim 3 further comprising a delay fiber and a 2×2 optical coupler coupled between adjacent ones of said sensors.

5. The time division multiplexing fiber optic Michelson interferometric sensor system as recited in claim 4 wherein the light splitting ratios of said 2×2 optical couplers coupled between said adjacent ones of said sensors are preselected to substantially equalize the average output light intensities of said sensors.

6. The time division multiplexing fiber optic Michelson interferometric sensor system as recited in claim 4 wherein said means for sampling and demodulating said electrical interference signals includes a plurality of sample and hold circuits respectively corresponding to said sensors.

7. The time division multiplexing fiber optic Michelson interferometric sensor system as recited in claim 6 wherein said means for sampling and demodulating said electrical interference signals includes a plurality of demodulation circuits respectively corresponding to said sensors.

8. A time division multiplexing fiber optic Michelson interferometric sensor system comprising:

(a) a laser light source for generating a continuous wave optical signal;

(b) a modulator optically coupled to said laser light source for generating a pulsed input optical signal responsive to said continuous wave optical signal;

(c) an input lead fiber optically coupled to said modulator;

(d) a plurality of sensors optically coupled to said input lead fiber for collectively generating a pulsed output optical signal responsive to said pulsed input optical signal, each said sensor including an unbalanced Michelson interferometer having a 2×2 optical coupler and a pair of Faraday rotator mirrors coupled thereto;

(e) an output lead fiber optically coupled to said sensors;

(f) a compensating interferometer optically coupled to said output lead fiber for generating responsive to said pulsed output optical signal a plurality of optical interference signals, said compensating interferometer having a 3×3 optical coupler and a pair of Faraday rotator mirrors coupled thereto;

(g) a plurality of optical detectors coupled to said compensating interferometer for respectively transducing said optical interference signals to a plurality of electrical interference signals; and, (h) means coupled to said optical detectors for sampling and demodulating said electrical interference signals at preselected times;

whereby said sensor system is adapted for operation substantially insensitive to polarization-induced signal fading.

9. The time division multiplexing fiber optic Michelson interferometric sensor system as recited in claim 8 further comprising a first substantially polarization-insensitive optical isolator coupled to both said modulator and said input lead fiber and a second substantially polarization-insensitive optical isolator coupled to both said compensating interferometer and said output lead fiber.

10. The time division multiplexing fiber optic Michelson interferometric sensor system as recited in claim 9 further comprising a third substantially polarization-insensitive optical isolator coupled to at least one of said sensors and to said input lead fiber and a fourth substantially polarization-insensitive optical isolator coupled to at least one of said sensors and to said output lead fiber.

11. The time division multiplexing fiber optic Michelson interferometric sensor system as recited in claim 8 wherein said continuous wave signal generated by said laser light source is characterized by a coherence length parameter greater than the maximum difference between the characteristic fiber arm path length difference parameter of said compensating interferometer and the characteristic fiber arm path length difference parameters of said Michelson interferometers of said sensors.

12. The time division multiplexing fiber optic Michelson interferometric sensor system as recited in claim 11 wherein said laser light source includes a laser diode adapted to generate an optical signal having a wavelength of at least 1.55 microns.

13. The time division multiplexing fiber optic Michelson interferometric sensor system as recited in claim 11 wherein said modulator is characterized by an extinction ratio parameter greater than 30 dB.

14. The time division multiplexing fiber optic Michelson interferometric sensor system as recited in claim 8 further comprising millimeter resolution optical time domain reflectometry means coupled to said modulator for maintaining the maximum difference between the characteristic fiber arm path length difference parameter of said compensating interferometer and the characteristic fiber arm path length difference parameters of said Michelson interferometers of said sensors below a predetermined value.

15. The time division multiplexing fiber optic Michelson interferometric sensor system as recited in claim 8 wherein the free ends of each said optical coupler are characterized by a cutout angle parameter greater than ten degrees for endpoint reflection attentuation.

16. The time division multiplexing fiber optic Michelson interferometric sensor system as recited in claim 8 wherein said 3×3 optical coupler of said compensating interferometer is characterized by approximately a 1:1:1 light splitting ratio.

* * * * *